United States Patent [19]

Yasumura et al.

[11] Patent Number: 4,692,914

[45] Date of Patent: Sep. 8, 1987

[54] REPRODUCING DEVICE FOR FREQUENCY MODULATED SIGNALS

[75] Inventors: Hiroto Yasumura, Kanagawa; Susumu Kozuki, Tokyo; Masahiro Takei, Kanagawa, all of Japan

[73] Assignee: Canon Kabushiki Kaisha, Tokyo, Japan

[21] Appl. No.: 615,785

[22] Filed: May 31, 1984

[30] Foreign Application Priority Data

| May 31, 1983 | [JP] | Japan | 58-97276 |
| May 31, 1983 | [JP] | Japan | 58-97277 |
| Jul. 6, 1983 | [JP] | Japan | 58-123700 |
| Jul. 15, 1983 | [JP] | Japan | 58-129247 |

[51] Int. Cl.$^4$ ............................................. G11B 20/24
[52] U.S. Cl. .................................... 369/49; 360/33.1; 360/64
[58] Field of Search ............... 358/327, 336, 340, 342; 360/30, 38.1, 61, 64, 33.1; 369/40, 49, 47

[56] References Cited

U.S. PATENT DOCUMENTS

| 3,347,984 | 10/1967 | Holmberg | 360/38.1 |
| 3,356,794 | 12/1967 | Felix | 360/38.1 |
| 3,936,619 | 2/1976 | Sugimoto et al. | 369/49 |
| 4,013,841 | 3/1977 | Ohkubo et al. | 369/49 |
| 4,021,852 | 5/1977 | Hurst et al. | 360/64 |
| 4,106,063 | 8/1978 | Lackner et al. | 360/38.1 |
| 4,221,930 | 9/1980 | Okuno | 360/38.1 |
| 4,382,299 | 5/1983 | Dieterich | 360/38.1 |
| 4,462,048 | 7/1984 | Ross | 358/336 |
| 4,490,754 | 12/1984 | Kluth | 360/64 |
| 4,492,988 | 1/1985 | Hashimoto et al. | 358/336 |

Primary Examiner—Donald McElheny, Jr.
Attorney, Agent, or Firm—Toren, McGeady & Associates

[57] ABSTRACT

A frequency modulated signal reproducing device comprises a reproducing device for reproducing a frequency modulated signal from a recording medium; a pilot signal generating device for generating a pilot signal relative to a discontinued part of the signal reproduced by the reproducing means; a phase lock device which generates a phase locked signal which is phase locked relative to the reproduced signal; a demodulating device for frequency demodulating the phase locked signal; and control means for controlling the response speed of the phase lock means on the basis of the pilot signal.

10 Claims, 15 Drawing Figures

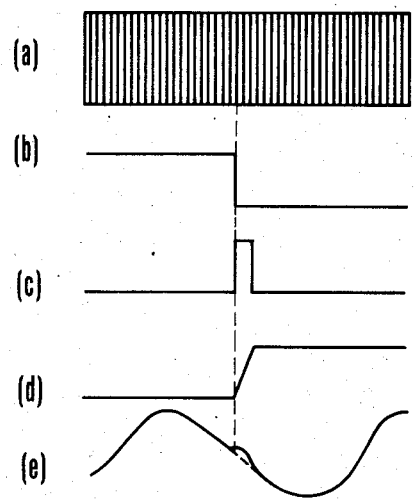
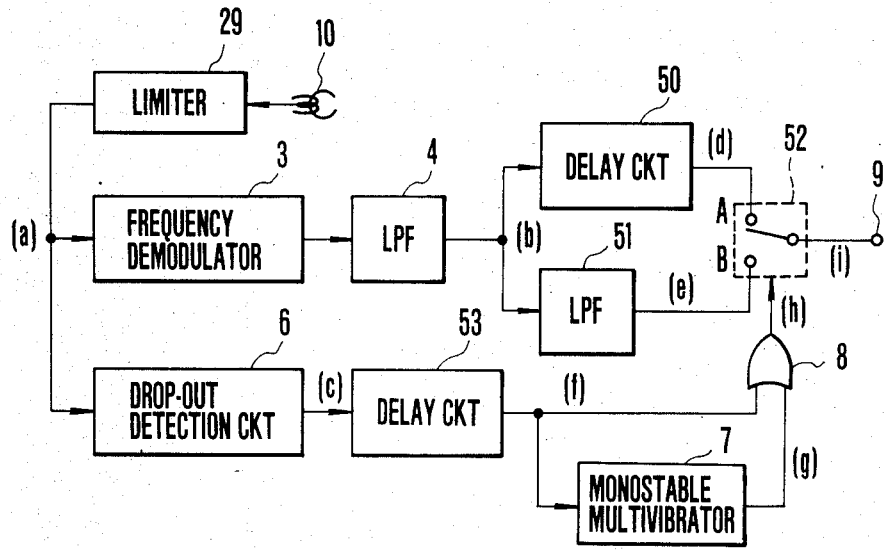

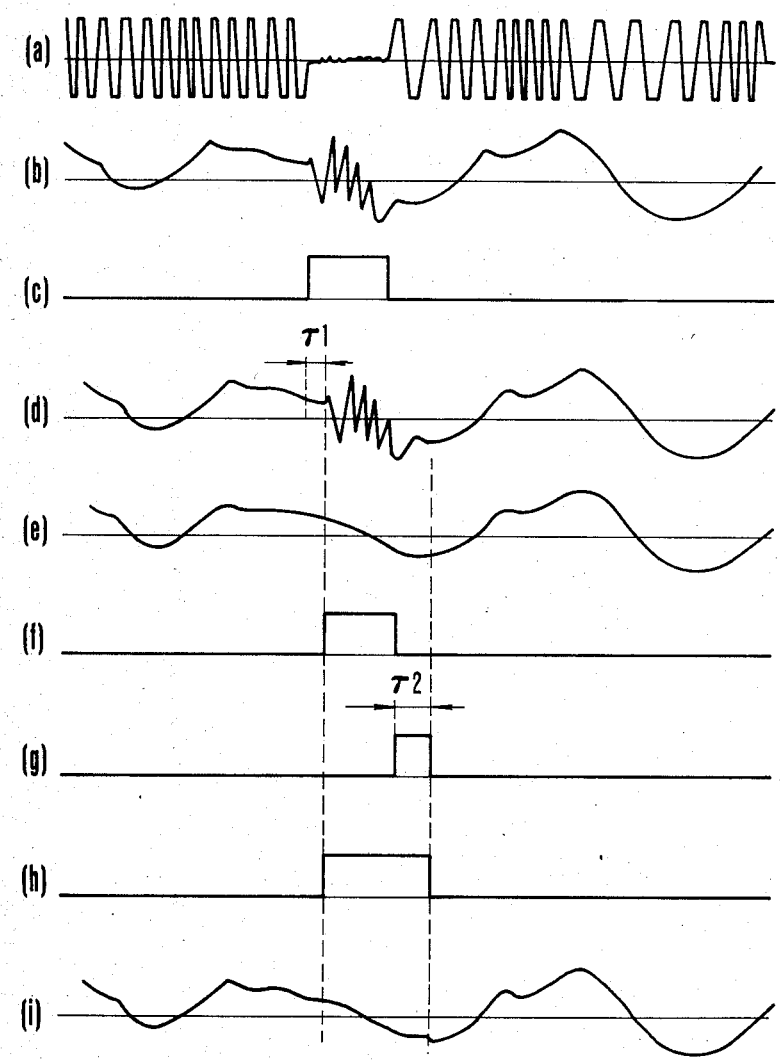

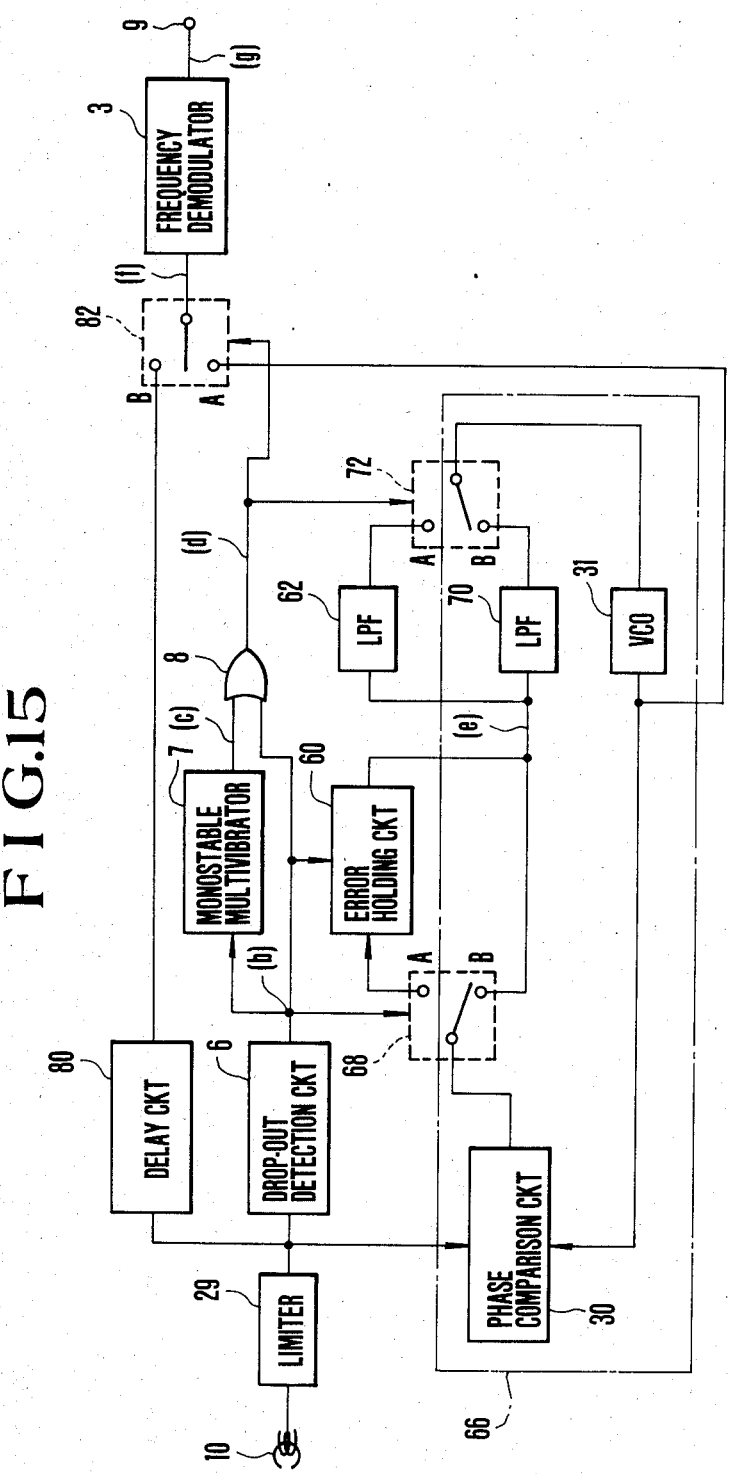
F I G. 15

REPRODUCING DEVICE FOR FREQUENCY MODULATED SIGNALS

BACKGROUND OF THE INVENTION

1. Field of the Invention

This invention relates to a frequency modulated signal reproducing device and, more particularly, to a device arranged to reproduce an information signal which is recorded with frequency modulation and has no time correlativity.

2. Description of the Prior Art

In reproducing an information signal having time correlativity such as a video signal or the like, when a discontinued part arises in the signal due to a drop-out or the like, such a discontinued part has been in general compensated for with some other part of the signal that is correlated with the discontinued part. However, in the event of occurrence of such a discontinued part in an information signal reproduced from an audio signal which has no time correlativity, the discontinued part cannot be replaced with another part in the above-stated manner. Occurrence of such a discontinued part in a reproduced frequency modulated signal greatly disturbs the information since it results in a noise of large amplitude in the information signal obtained after frequency demodulation.

During recent years, there appeared two-head helical scanning type video recorders (hereinafter will be called VTR) which are arranged to reproduce an audio signal from a recording tape containing a multiple signal consisting of a frequency modulation recorded audio signal and a recorded video signal. In the VTR of this type, the frequency modulated audio signal becomes discontinuous between the output of one head and that of the other. Then, the discontinued part brings about some slight time difference. The reproduced frequency modulated audio signal is phase modulated at the time of switch-over from one head to the other. As a result of this, a pulse noise of large amplitude is included in a frequency demodulated output. With the demodulated output allowed to pass through a low pass filter (hereinafter will be called LPF), there takes place a transient distortion. This brings about a noise which lasts over a certain given period of time after the above-stated head switch-over. In addition to this, assuming that the heads are arranged to make 60 turns per sec., the noise arises at that frequency. Therefore, the noise becomes quite disagreeable to the ear as it mixes with such 60 Hz components, for example, and their higher harmonics.

To solve this problem, therefore, when an information signal having no time correlativity, such as an audio signal, is to be reproduced and frequency demodulated, there have been employed various noise eliminating methods. In one such method, the audio signal part for each period during which the reproduced signal discontinues due to occurrence of a drop-out or switch-over from one reproducing track to another is arranged to be muted. In another method, the audio signal level immediately before the discontinued period is held over a predetermined period. FIG. 1 of the accompanying drawings shows the circuit arrangement of the conventional frequency modulated audio signal reproducing system provided with a drop-out compensating function. Referring to FIG. 1, the conventional system comprises a terminal 1 which is arranged to receive a frequency modulated audio signal reproduced by some reproducing means such as a head or the like; a band-pass filter 2 (hereinafter will be called BPF); a frequency demodulator 3; a low-pass filter (LPF) 4; a prior-value holding circuit 5; a drop-out detection circuit 6; a monostable multivibrator 7; a known OR circuit 8; and an audio signal output terminal 9.

FIG. 2 is a wave form chart showing the output wave forms of the parts (a)-(f) of FIG. 1. The conventional system operates in the following manner:

The reproduced frequency modulated audio signal which is supplied to the input terminal 1 comes through the BPF 2 to be demodulated by the frequency demodulator 3. The demodulated signal is made into an audio signal through the LPF 4. If the reproduced frequency modulated signal coming to the frequency demodulator 3 discontinues due to a drop-out, the wave form of the audio signal produced from the LPF 4 becomes as shown in FIG. 2(b). Further, the wave form of a drop-out detection signal obtained from the drop-out detection circuit 6 becomes as shown in FIG. 2(c).

The sound noise which is produced in the event of a drop-out as shown in FIG. 2(b) still remains even after the generation of the drop-out detection signal shown in FIG. 2(c). This is attributable to the transient characteristic of the LPF 4. In view of this, therefore, a drop-out detection pulse is supplied to the monostable multivibrator 7 to cause it to produce a pulse as shown in FIG. 2(d) during a period corresponding to the transient distortion generating period of the LPF 4. Then, a wave form which is shown in FIG. 2(e) is obtained by subjecting the drop-out detection pulse and the output pulse of the monostable multivibrator 7 to a logical sum obtaining process performed by the OR circuit 8. Then, the prior-value holding circuit 6 is operated by the output pulse of the OR circuit 8 to obtain the wave form of the reproduced audio signal as shown in FIG. 2(f). However, the reproduced audio signal thus obtained greatly differs from the original recorded audio signal and thus presents a problem in terms of fidelity because of the prolongation of the prior-value holding period resulting from the transient characteristic.

FIG. 3 shows the circuit arrangement of another prior art frequency modulated audio signal reproducing system which is provided with a function of removing the above-stated noise produced during switch-over of the heads of a VTR. The system comprises input terminals 11 and 12 arranged to receive a frequency modulated audio signal reproduced by different heads; a switching circuit 13 arranged to selectively produce the signal received by the terminal 11 or 12 according to a head switch-over pulse which will be described later herein; a BPF 14; a frequency demodulator 15; an LPF 16; a prior-value holding circuit 17; an input terminal 18 which is arranged to receive the head switch-over pulse; a hold pulse generation circuit 19; and an audio signal output terminal 20. FIG. 4 is a wave form chart or a timing chart showing the wave forms of the outputs of the parts (a)-(g) of FIG. 3. The operation of this prior art system will be described below with reference to the wave form chart of FIG. 4.

The frequency modulated audio signal which is supplied to the input terminal 11 of FIG. 3 having a wave form as shown in FIG. 4(a) and the frequency modulated audio signal which is supplied to the input terminal 12 having a wave form as shown in FIG. 4(b) are put together by the switching circuit 13 to obtain a continuous frequency modulated audio signal as shown in FIG. 4(d). Then, the audio signal is supplied to the frequency demodulator 15. However, if there is a time difference between the frequency modulated audio signals supplied to the terminals 11 and 12, phase modulation is caused by a phase difference resulting from the time difference existing at the time of signal switch-over effected by the head switch-over pulse supplied to the terminal 18. Therefore, the output of the frequency demodulator 15 includes a pulse noise due to the phase modulation which takes place at the time of head switch-over. Then, due to the transient characteristic of the LPF 16, a noise of large amplitude appears in the output wave form of the LPF 16 as shown in FIG. 4(e). Meanwhile, the head switch-over pulse supplied to the head switch-over pulse input terminal 18 is supplied also to the hold pulse generation circuit 19, which produces a hold pulse as shown in FIG. 4(f). The prior-value holding circuit 16 is then operated with this hold pulse. As a result of this, the audio signal output terminal 20 produces a signal of a wave form which is as shown in FIG. 4(g). However, due to the prior-value holding period which is prolonged by the transient characteristic of the LPF, the reproduced audio signal thus obtained deviates from the original recorded audio signal. Therefore, it becomes impossible to reproduce the original sound with fidelity.

SUMMARY OF THE INVENTION

It is therefore an object of this invention to provide a frequency modulated signal reproducing device which is capable of reproducing, with fidelity, the original signal to eliminate the shortcoming of the prior art described in the foregoing.

It is another object of the invention to provide a frequency modulated signal reproducing device which is capable of removing a noise of large amplitude produced by discontinuation of a reproduced frequency modulated signal.

It is a further object of the invention to provide a frequency modulated signal reproducing device capable of preventing occurrence of a periodic noise due to discontinuation of a reproduced frequency modulated signal resulting from switch-over from one reproduction track to another.

To attain these objects, a preferred embodiment of the invention comprises (a) reproducing means for reproducing a frequency modulated signal from a recording medium; (b) pilot signal generating means for generating a pilot signal relative to a discontinued part of the signal reproduced by the reproducing means; (c) phase lock means which generates a phase locked signal which is phase locked relative to the reproduced signal; (d) demodulating means for frequency demodulating the phase locked signal; and (e) control means for controlling the response speed of the phase locked means on the basis of the pilot signal.

These and further objects and features of the invention will become apparent from the following detailed description of preferred embodiments thereof taken in conjunction with the accompanying drawings.

BRIEF DESCRIPTION OF THE DRAWINGS

FIG. 9 consisting of (a)–(e) is a timing chart showing the output wave form of each part of the device of FIG. 8.

FIG. 10 is a block diagram showing the arrangement of essential parts of a frequency modulated signal reproducing device arranged as a further embodiment of the invention.

FIG. 11 consisting of (a)–(i), is a timing chart showing the output wave form of each part of FIG. 10.

FIG. 15 is a block diagram showing the essential parts of a frequency modulated signal reproducing device arranged as a still further embodiment of the invention.

DETAILED DESCRIPTION OF THE PREFERRED EMBODIMENTS

Figure 1:
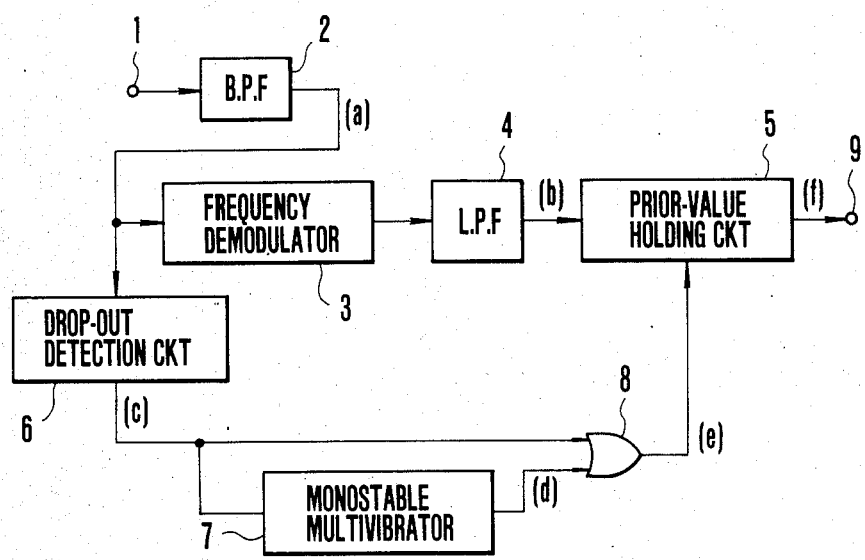
FIG. 1 is a block diagram showing an example of the conventional frequency modulated signal reproducing device.
Figure 2:
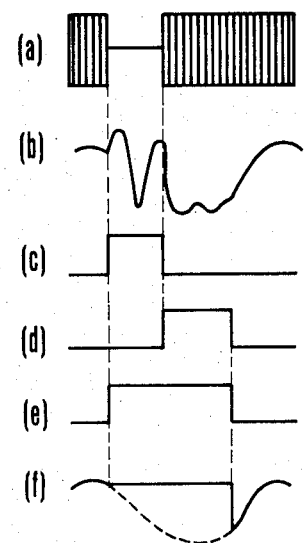
FIG. 2, consisting of (a)–(f), is a timing chart showing the wave form of the output of each part of the conventional device shown in FIG. 1.
Figure 5:
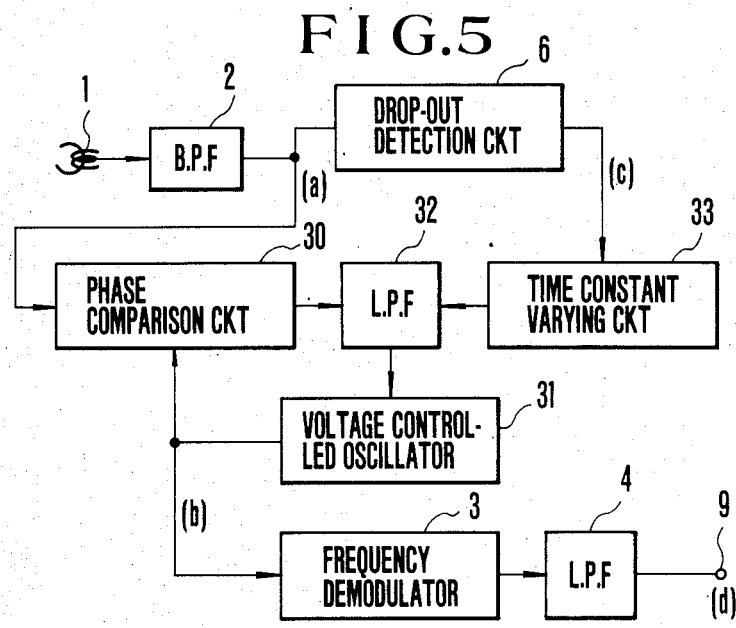
FIG. 5 is a block diagram showing the arrangement of essential parts of a frequency modulated signal reproducing device arranged according to the invention as an embodiment thereof.
Figure 6:
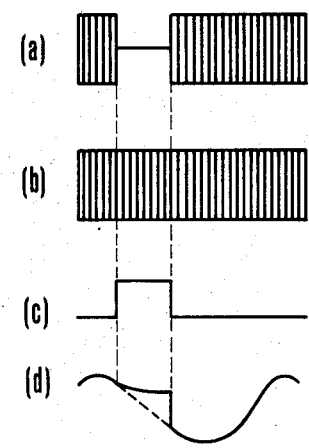
FIG. 6 consisting of (a)–(d) is a timing chart showing the wave form of the output of each part of the embodiment shown in FIG. 5.

Referring now to the accompanying drawings, preferred embodiments of the invention will be described below for a more complete understanding:

FIG. 5 shows the reproducing circuit arrangement of a frequency modulated signal reproducing device as an embodiment of the invention. In FIG. 5, the components which are similar to those of FIG. 1 are indicated by the same reference numerals as those used in FIG. 1. The embodiment includes a phase comparison circuit 30; a voltage controlled oscillator 31 (hereinafter will be called VCO); and LPF 32; and a time constant varying circuit 33. FIG. 6 is a wave form chart showing the output wave form of each of the parts (a)–(d) shown in FIG. 5. The operation of the embodiment is as follows:

Referring to FIG. 5, a frequency modulated audio signal reproduced by a reproducing head 10 is supplied via a BPF 2 to the phase comparison circuit 30. A phase lock loop (hereinafter will be called PLL) is formed by the phase comparison circuit 30; the VCO 31 and the LPF 32. A signal produced from the VCO 31 is phase locked relative to the reproduced frequency modulated audio signal supplied to the phase comparison circuit 30. The output of the VCO 31 is supplied to a frequency demodulator 3. An audio signal which is demodulated by the frequency demodulator 3 is supplied to the audio signal output terminal 9 via an LPF 4.

When the reproduced frequency modulated signal which is being supplied to the phase comparison circuit 30 discontinues due to a drop-out, a drop-out detection circuit 6 produces a drop-out detection signal as shown in FIG. 6(c). During the period of generation of this signal, the time constant varying circuit 33 increases the time constant of the LPF 32 which forms the PLL in such a way as to delay the response of the PLL. Therefore, in the event of occurrence of a drop-out, the response of the PLL causes the frequency of the signal produced from the VCO 31 to slowly change toward the free-running frequency of the PLL. With the free-running frequency set at the carrier center frequency of the recorded frequency modulated audio signal, the frequency of the signal which is produced from the VCO 31 and supplied to the frequency demodulator 3 as shown in FIG. 6(b) gradually becomes closer to the carrier center frequency. Upon termination of the drop-out period, the response of the PLL becomes sufficiently faster to be able to follow the reproduced frequency modulated audio signal. Thus, the signal produced from the VCO 31 is phase locked to the input signal. The frequency demodulator 3 and the LPF 4 then give a reproduced audio signal of a wave form as shown in FIG. 6(d).

In other words, the frequency demodulator 3 normally receives a frequency modulated signal which is phase locked relative to the reproduced frequency modulated audio signal. Then, in the event of a drop-out, the frequency demodulator 3 receives a signal of frequency which shifts from the frequency immediately before the occurrence of the drop-out to the free-running frequency which is set at the carrier center frequency of the frequency modulated audio signal. The frequency demodulator 3 thus receives an input signal even during the drop-out period. This arrangement effectively prevents any transient distortion due to the LPF 4, since such a noise that would be produced by supply of a signal under no signal condition is thus prevented from being produced.

Figure 7:
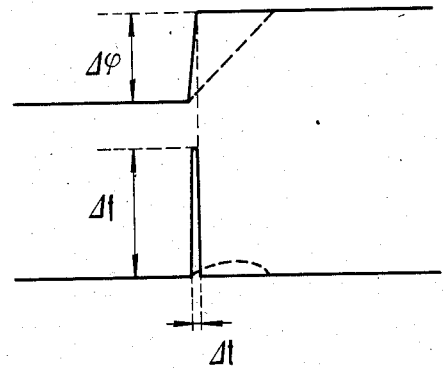
FIG. 7 is an illustration of relation between an input signal and an output signal of the frequency demodulator of the embodiment.

FIG. 7 shows the wave form of a signal reproduced through the frequency demodulator with the phase of a signal supplied to the demodulator changed. Assuming that the degree of change in phase is $\Delta\phi$ and a changing time $\Delta t$, an instantaneous frequency change $\Delta f$ within the changing time $\Delta t$ is expressed as:

$$\Delta F = d(\phi)/dt$$

The instantaneous frequency change $\Delta f$ is detected by the frequency demodulator and is produced as a change in signal through the LPF. The signal change thus produced becomes a sound noise.

Figure 3:
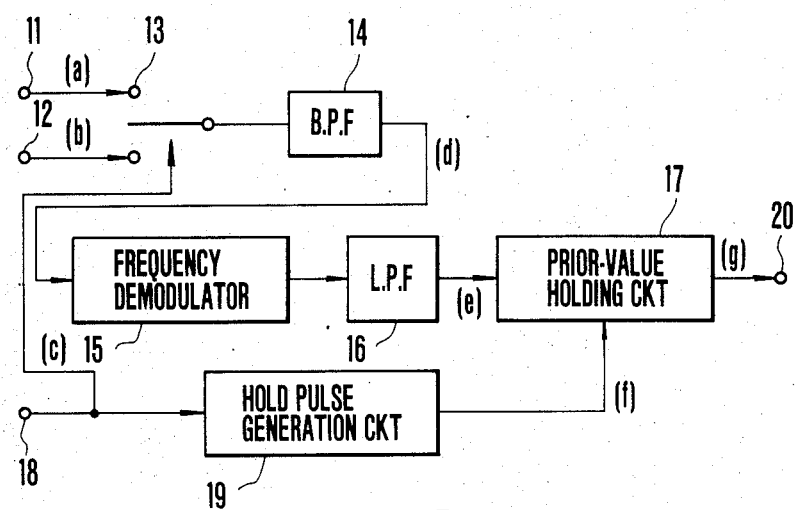
FIG. 3 is a block diagram showing another example of the conventional frequency modulated signal reproducing device.
Figure 4:
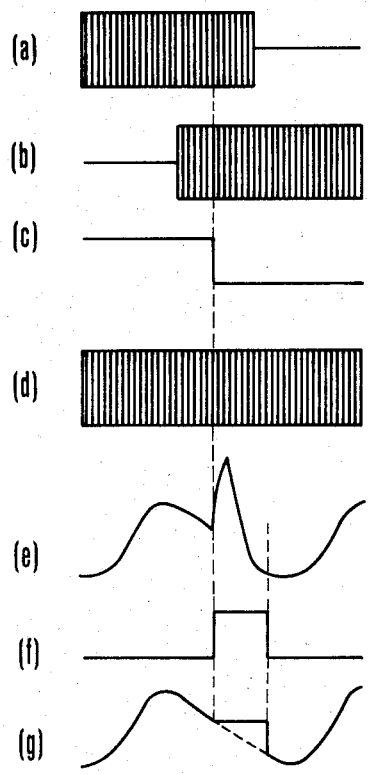
FIG. 4 consisting of (a)–(g), is a timing chart showing the wave form of the output of each part of the device shown in FIG. 3.
Figure 8:
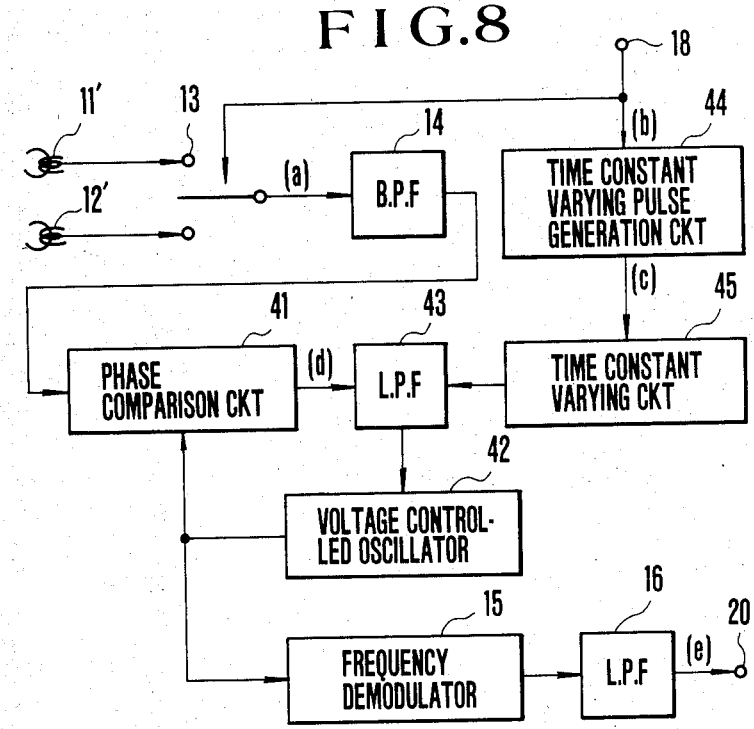
FIG. 8 is a block diagram showing the arrangement of essential parts of a frequency modulated signal reproducing device arranged as another embodiment of the invention.

FIG. 8 is a circuit diagram showing the circuit arrangement of essential parts of a frequency modulated signal reproducing device arranged as another embodiment of the invention. The components similar to those of FIG. 3 are indicated by the same reference numerals as those used in FIG. 3. This embodiment includes a phase comparison circuit 41; a VCO 42; an LPF 43; a time constant varying pulse generation circuit 44; a time constant varying circuit 45; a phase comparison circuit 41; a VCO 42; and an LPF 43 which forms a PLL. FIG. 9 is a timing chart showing the output wave form of the parts (a)–(e) shown in FIG. 8. Referring now to FIG. 9, the circuit arrangement of FIG. 8 operates as follows: Frequency modulated audio signals reproduced respectively by reproducing heads 11' and 12' are combined together by a switch-over circuit 13 into a frequency modulated audio signal as shown in FIG. 9(a). The combined audio signal is supplied via a BPF 14 to the phase comparison circuit 41. The phase comparison circuit 41, the VCO 42 and the LPF 43 form a PLL. A signal produced from the VCO 42 is phase locked relative to the reproduced frequency modulated audio signal supplied to the phase comparison circuit 41. A signal produced from the VCO 42 is supplied to a frequency demodulator 15. Then, the audio signal which thus has undegone a detection process is supplied via an LPF 16 to an audio signal output terminal 20.

Meanwhile, a signal is supplied to a head switch-over pulse input terminal 18 having a wave form as shown in FIG. 9(b). The time constant varying pulse generation circuit 44 then produces a signal having a wave form as shown in FIG. 9(c). In response to this, the time constant varying circuit 45 operates so that the response time of the PLL later than the head switching time by a predetermined length of time. Then, the phase difference of the signal produced from the VCO 42 shows a characteristic as shown in FIG. 9(d). The signal detected by the frequency demodulator 15 is supplied via the LPF 16 to the audio signal output terminal 20. The wave form of this signal is as shown in FIG. 9(e).

With the embodiment arranged to have the circuit arrangement as described above, the frequency modulated signals combined by the switch-over circuit 13 is converted into the output signal of the VCO 42 which is phase locked by the PLL. The output of the VCO 42 is FM detected. With the response of the above-stated PLL arranged to be later the the head switching time by a predetermined length of time, generation of a noise of large amplitude in the reproduced frequency modulated audio signal can be suppressed and the noises due to the head switching cycle and the contingent higher harmonic component also can be suppressed.

FIG. 10 shows a drop-out compensating circuit for a reproduced frequency modulated audio signal of a reproducing device which is arranged as another embodiment of the invention. In FIG. 10, the components of the device similar to those of FIG. 1 are indicated by the same reference numerals as those used in FIG. 1. This embodiment includes a delay circuit 50; an LPF 51 which has a cut-off frequency arranged to be sufficiently lower than that of another LPF 4; a change-over switch 52; and another delay circuit 53. The delay time of both the delay circuits 50 and 53 is arranged according to the cut-off frequency of the LPF 51. The arrangement is such that the time delay due to passing of the signal through the LPF 51 can be compensated for beforehand.

FIG. 11 is a timing chart showing the wave forms of outputs of parts (a)–(i) of FIG. 10. Referring to FIG. 11, the embodiment shown in FIG. 10 operates as follows: A reproduced frequency modulated audio signal which has been reproduced by a reproducing head 10 is allowed to pass through a limiter 29 in order to have an amplitude varied portion thereof removed thereby as shown in FIG. 11(a). The signal thus processed is supplied to a frequency demodulator 3 and a drop-out detection circuit. In the event of occurrence of a drop-out in the frequency modulated audio signal, there appear a noise of large amplitude and a transient noise in the output of the LPF 4 which are connected to a stage subsequent to the demodulator 3. These noises are as shown in FIG. 11(b). The output of the LPF 4 is supplied to the delay circuit 50 and the LPF 51. The wave forms of their outputs are as shown in FIG. 11(d) and FIG. 11(e). The cut-off frequency of the LPF 51 is lower than that of the LPF 4 and is sufficiently low for removing the noise of large amplitude and the transient noise almost completely. The delay circuit 50 has a delay time which is equal to the length of time delay $\tau1$ caused by the LPF 51. The output of the delay circuit 50 is supplied to the terminal A of the change-over switch 52 and that of the LPF 51 to the other terminal B of the switch 52.

When a drop-out is detected by the drop-out detection circuit 6 the circuit 6 produces a pulse signal which remains at a high level during the period of the drop-out as shown in FIG. 11(c). The output of the drop-out detection circuit 6 is delayed by the delay circuit 53 which also has the above-stated delay time $\tau1$ as shown in FIG. 11(f). The delayed drop-out detection pulse signal is supplied to an OR gate 8 and a monostable multivibrator 7. The monostable multivibrator 7 triggers its output terminal at the rise of the input to produce a pulse signal which remains at a high level over a length of time $\tau2$ corresponding to the period during which the transient noise is produced as shown in FIG. 11(g). As a result, the OR gate 8 produces a pulse signal which is obtained by adding up these pulse signals as shown in FIG. 11(h). The switch 52 is connected to the terminal B thereof when the output level of the OR gate 8 is high and to the other terminal A when the output level of the OR gate is low. During the drop-out period of the reproduced audio signal and the transient noise generating period shown in FIG. 11(d), therefore, the low frequency signal which is obtained through the LPF 51 is substituted to obtain a smooth correction signal as shown in FIG. 11(i).

With the reproducing device arranged as described above in the event of occurrence of a drop-out in the reproduced frequency modulated audio signal, the noise of large amplitude and the transient noise contained in the output of the frequency demodulator 3 is replaced with a reproduced audio signal of low frequency which is free from these noise. Therefore, compared with the holding method of the prior art, a smoother drop-out correction signal can be obtained.

Figure 12:
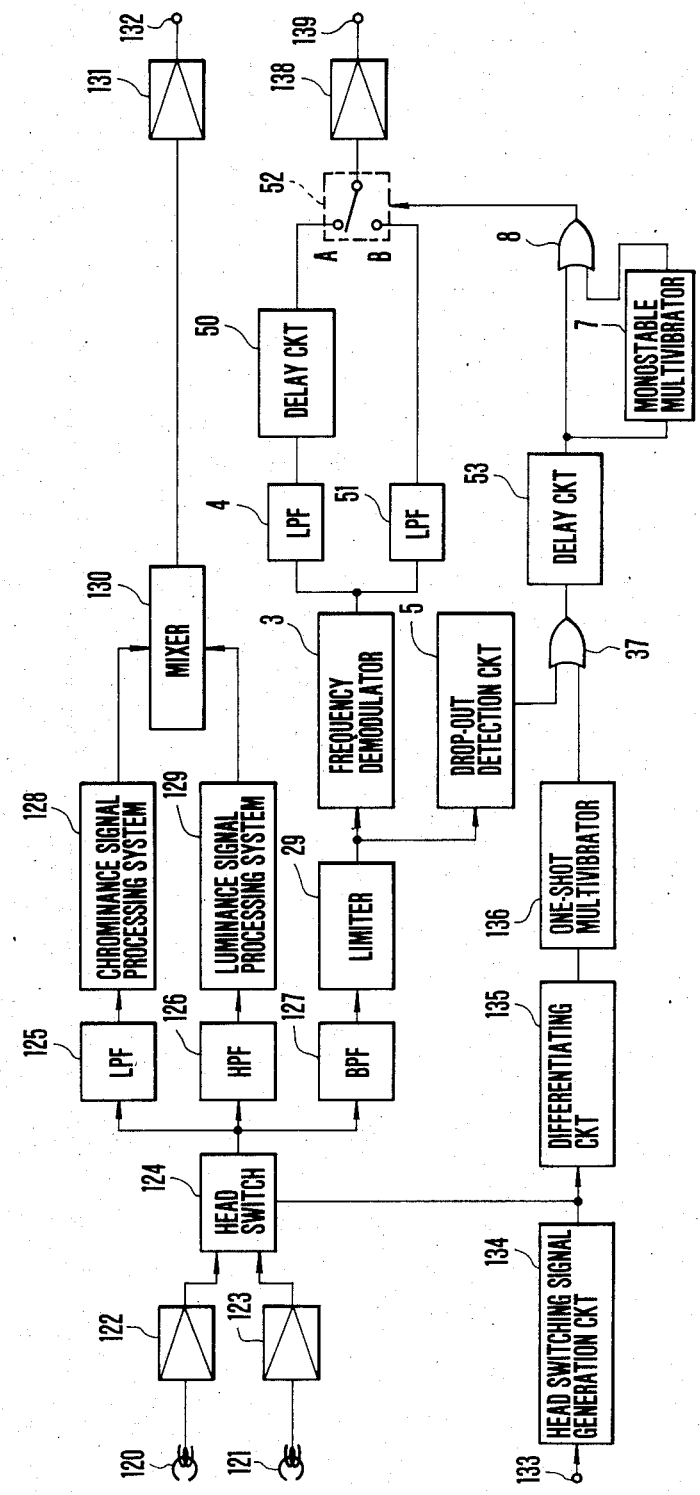
FIG. 12 is a block diagram showing the circuit arrangement of the reproduction system of a VTR arranged according to the invention as an embodiment thereof.

FIG. 12 shows a reproduction circuit system of a VTR as an embodiment of the invention. In the case of FIG. 12, a mixed signal consisting of a color video signal and an audio signal is recorded with two heads on a magnetic tape adjacently forming recording tracks one after another on the tape and then the recorded signal is reproduced. The invention is applied to the reproduction system of the VTR. In mixing these signals, the VTR employs a known method in which the color video signal has its luminance signal frequency modulated within a relatively high band; its chrominance signal frequency modulated within a low band; while the audio signal is frequency modulated within an intermediate band. In FIG. 12, the components similar to those shown in FIG. 10 are indicated by the same reference numerals as those used in FIG. 10. The VTR is provided with rotary heads 120 and 121 which are arranged on a cylinder (not shown) with their phases differentiated 180 degrees from each other; pre-amplifiers 122 and 123; a head change-over switch 124; a chrominance signal separating LPF 124; a luminance signal separating high-pass filter 126 (hereinafter a high-pass filter will be called HPF); an audio signal separating BPF 127; a chrominance signal processing system circuit 128; a luminance signal processing system circuit 129; a mixer 130; a reproduction amplifier 131; a color video signal output circuit 132; and a terminal which is arranged to receive a signal relative to the rotation phase of the above-stated rotary heads. Assuming that the video signal is an NTSC signal, the level of the input signal received by the terminal 133 is a rectangular wave of 30 Hz the level of which alternately becomes high and low at every 1/60 sec. The circuit arrangement further includes a head switching signal forming circuit 134; a differentiation circuit 135; a one-shot multivibrator 136; an OR gate 137; an audio signal reproduction amplifier 138; and an output terminal 139 for a reproduced audio signal. The embodiment operates as follows:

Reproduced signals obtained from the heads 120 and 121 are respectively supplied via amplifiers 122 and 123 to the head change-over switch 124. The head change-over switch 124 is arranged to be controlled by a head switching pulse signal formed by the head switching signal forming circuit 134 according to the rectangular wave signal of 30 Hz supplied to the terminal 133. A reproduced mixed signal which is made into a continuous signal by the head switch 124 is supplied to the LPF 125, HPF 126 and BPF 127. A low zone converted chrominance signal is separated by the LPF 125 and is processed by the chrominance signal processing system 128 in a known manner and is thus brought back to its original band (which is 3.58 MHz in the case of an NTSC signal). The chrominance signal which is thus processed is supplied to the mixer 130. A frequency modulated luminance signal is separated by the HPF 126 and undergoes known processes such as AGC, frequency demodulation clipping, clamping, etc. which are carried out at the luminance signal processing circuit 129. The luminance signal thus processed is then supplied to the mixer 130. A reproduced color video signal which is thus obtained from the mixer 130 is produced from the terminal 132 via the reproduction amplifier 131. Meanwhile, the frequency modulated audio signal separated by the BPF 127 is demodulated by the frequency demodulator 3 via the limiter 29. The demodulated audio signal is supplied to the terminal A of the switch 52 via the LPF 4 and the delay circuit 50 and also to the other terminal B of the switch 52 via the LPF 51. In the same manner as in the embodiment shown in FIG. 10, the signal produced from the switch 52 is thus obtained through the LPF 51 which has a low cut-off frequency during the period of drop-out generation and the transient noise generation.

The mixed signal is made into a continuous signal by the head switch 124 as mentioned in the foregoing. However, it is inevitable that some small time discrepancy arises at each joint part of the continuous signal. In the case of a video signal, a discontinued part due to such discrepancy can be arranged not to appear in the reproduced picture. Whereas, in the case of an audio signal, occurrence of a discontinuance due to head switching during the period of 1/60 sec. results in a noise in the reproduced signal. In the event of an audio signal recorded with frequency modulation in particular, the reproduced frequency modulated signal becomes discontinuous. If the frequency modulated signal including such a discontinued part is demodulated, a noise of large amplitude and a transient noise appear in the demodulated audio signal. The noise is generated at the time of switch-over from one head to the other and also during the ensuing operation period of the phase lock loop included in the frequency demodulator 3. In reproducing a frequency modulated audio signal, therefore, the same process that is performed at the time of occurrence of a drop-out must be carried out also at the time of head switching.

In the head switching signal forming circuit 134 of FIG. 12, a head switching signal is generated by suitably adjusting the phase of the above-stated rectangular wave signal of 30 Hz and the phase adjusted signal is supplied to the head change-over switch 124. This head switching signal is supplied also to the differentiation circuit 135. The differentiation circuit 135 is arranged to produce a hair-like pulse at the timing for head switch-over either in a positive or negative direction. This hair-like pulse triggers the one-shot multivibrator 136 to cause the vibrator 136 to produce a signal which momentarily becomes a high level at the time of head switching. A logical sum is obtained at the OR gate 137 from this signal and a drop-out detection signal produced from the drop-out detection circuit 5. Then, a noise removing process is performed at the time of head switching in the same manner as at the time of occurrence of a drop-out. In other words, the demodulated audio signal is arranged to be produced from the switch 52 via the LPF 51 which is of low cut-off frequency at the time of head switching and a transient noise generating period which follows the head switching process. The audio signal thus obtained from the switch 52 is produced via the reproduction amplifier 38 from the terminal 39. The advantage of the VTR which is provided with the above-stated reproduction system is as follows: During the periods of occurrence of discontinued parts in the reproduced frequency modulated audio signal due to the occurrence of a drop-out and head switching and ensuing transient noise generating periods, the reproduced audio signal is replaced with a low frequency reproduced audio signal which is free from noises of large amplitude and transient noises, so that a satisfactory reproduced audio signal can be obtained.

Figure 13:
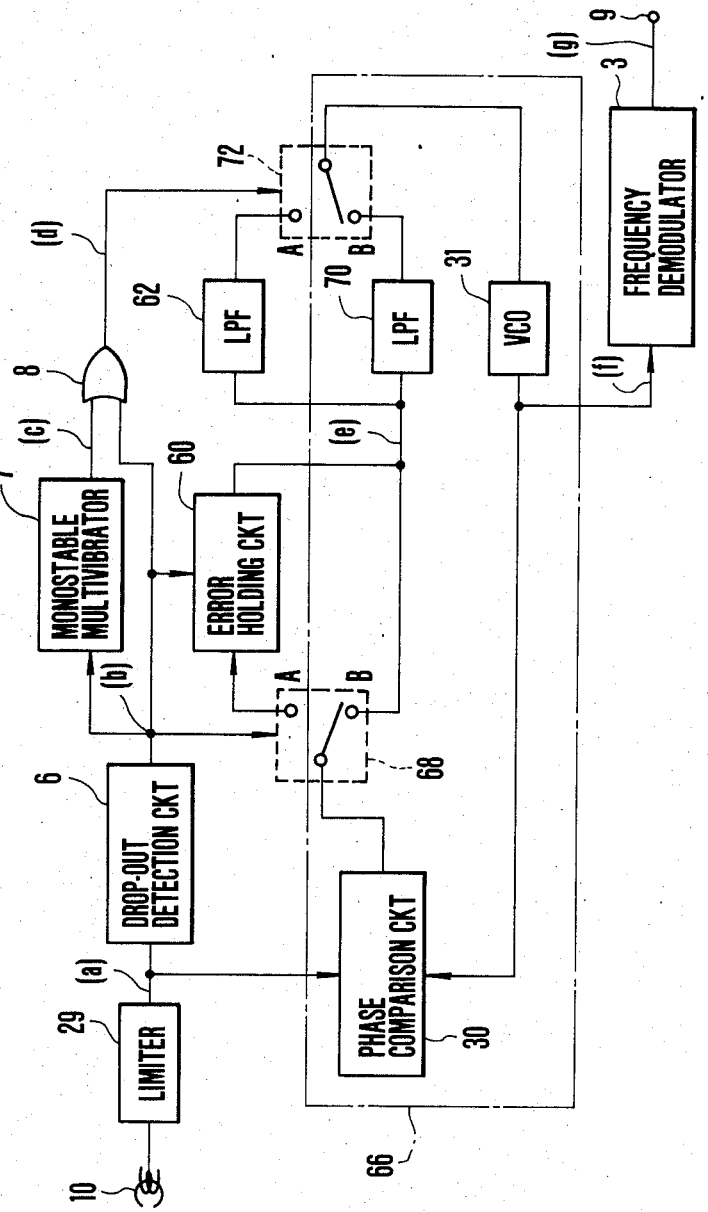
FIG. 13 is a block diagram showing the arrangement of essential parts of a frequency modulated signal reproducing device arranged as another embodiment.
Figure 14:
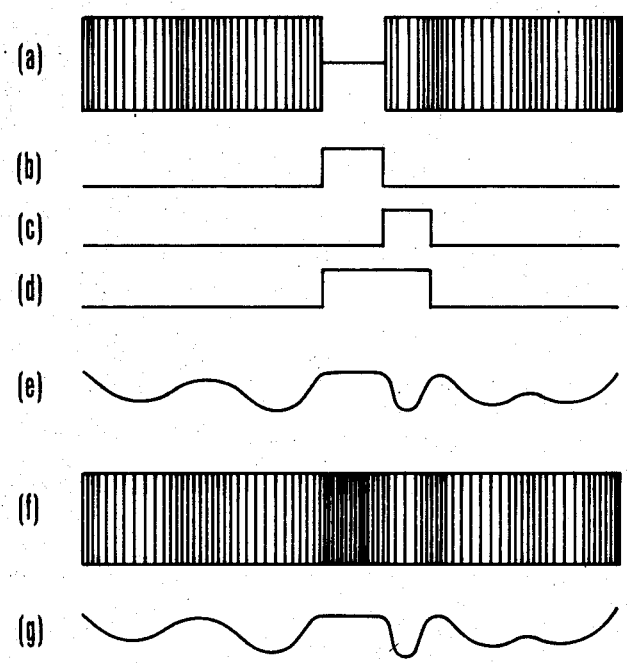
FIG. 14, consisting of (a)–(g), is a timing chart showing the output wave form of each part of FIG. 13.

FIG. 13 shows a frequency modulated audio signal reproducing system of a VTR arranged as a further embodiment of the invention. FIG. 14 is a timing chart showing output wave forms of parts (a)–(g) shown in FIG. 13.

The embodiment includes a reproducing head 10 which is arranged to reproduce a frequency modulated audio signal. The reproduced frequency modulated signal is supplied to a limiter 29 which forms a signal corresponding to frequency modulation by removing the amplitude component of the reproduced signal. The signal from the limiter 29 is supplied to a phase comparator 30 of an APC oscillator 66 which includes a phase locked loop (PLL). The phase comparator 30 produces an error signal. The error signal is supplied to a voltage controlled oscillator (VCO) 31 through one terminal B of a switch 68, an LPF one terminal B of another switch 72. The phase comparator 30 compares the output of the VCO 31 with the above-stated signal corresponding to the frequency modulation and is arranged to form a so-called PLL. The oscillation output of the VCO 31 is supplied to a frequency demodulator 3. The demodulator 3 then produces a reproduced audio signal to an output terminaL 9.

If a drop-out is caused to occur in the reproduced frequency modulated audio signal by, for example, a dust or the like sticking to the recording medium, the wave form of the output of the limiter 29 becomes as shown in FIG. 14(a). If the output is left in this state, a noise of large amplitude would occur in the reproduced audio signal. In the event of occurrence of such a drop-out, a drop-out detection circuit 6 produces a pulse as shown in FIG. 14(b). This pulse shifts the connecting position of the switch 68 to the terminal A. In this manner, during a drop-out generation periods, an error voltage produced from the phase comparator 30 is held by an error holding circuit 60 at a value obtained immediately before the occurrence of the drop-out. Accordingly, the VCO 31 comes to hold the oscillation frequency obtained immediately before the drop-out. Further, in synchronism with the fall of the drop-out detection pulse (b), a monostable multivibrator 7 is turned on for a predetermined period of time as shown in FIG. 14(c). This signal and the drop-out detection pulse signal are supplied to an OR gate 8, which then produces a switching pulse as shown in FIG. 14(d). In other words, during the drop-out period, the VCO 31 is holding the frequency of the frequency modulated audio signal obtained immediately before the drop-out. Further, during the period during which the high level signal is produced from the monostable multivibrator 7, a disorder within the above-stated PLL is compensated for phase locking between the output of the VCO 31 which is kept at the predetermined frequency immediately after the drop-out and the reproduced frequency modulated audio signal which is appearing again. With the LPF 62, which is of a lower time constant than the LPF 70 connected to the error holding circuit 60 during this period, abnormal oscillation can be prevented.

The error voltage produced from the phase comparator 30 is as shown in FIG. 14(e). This voltage has a signal wave form centering a predetermined reference voltage when there is no drop-out. In the event of a drop-out, this voltage is kept at a predetermined level during the drop-out period. Immediately after the end of the drop-out, the voltage comes to be corresponding to a phase difference between the reappearing reproduced frequency modulated audio signal and the output of the VCO 31. The disorder which takes place at this point of time is gradually compensated by the LPF 62 which has a larger time constant and the condition before occurrence of the drop-out is regained at the fall of the output of the monostable multivibrator 7.

With the reproduction system of the VTR arranged as described above, the output of the phase comparator 30 included in the PLL is kept at a predetermined level during the period of occurrence of a drop-out. Therefore, compared with the arrangement to pre-hold the reproduced signal after frequency demodulation, the abnormal oscillation of the VCO 31 of the PLL at the end of the drop-out period, i.e. the error voltage of the phase comparator 30 does not become high, so that the transient noise generation period can be shortened. Further, in the case of this embodiment, a reproduced signal which is relatively close to the original signal can be obtained by making the response speed of the PLL slower with the time constant of the filter arranged to be large during a period including the time immediately after the end of the drop-out.

FIG. 15 shows a frequency modulated audio signal reproducing system of a VTR as a still further embodiment of the invention. In FIG. 15, the components similar to those shown in FIG. 13 are indicated by the same reference numerals as those used in FIG. 13 and are omitted from description here. In the case of this embodiment, the output of an APC oscillator 66 (the output of a VCO 31) is used only while the output of an OR gate 8 is at a high level. Meanwhile, during a period not related to the drop-out, the output of a limiter 29 is allowed to be demodulated by a frequency demodulator 3. The switch-over between these outputs is effected by controlling a switch 82 with the output of the OR gate 8. The embodiment includes a delay circuit 80 which is arranged to compensate for a time delay of the output signal of the APC oscillator 66 due to an LPF 62. The arrangement of FIG. 13 can provide the same advantageous effect as can be obtained by the arrangement shown in FIG. 15.

Further, in the embodiments shown in FIGS. 13 and 15, the output the VCO 31 as the output of the the APC oscillator 66. However, since the output of the switch 72, which is an input signal for the VCO 31, is considered to approximately coincide with the demodulated audio signal, it is possible to use the output of the switch 72, i.e., the output of the LPF 62 or LPF 70 as the demodulated audio signal as it is.

While in the embodiment given, the invention is described as applied to reproduction of a frequency modulated audio signal, the invention can be advantageously applied to a device arranged to reproduce a signal recorded by frequency modulating an information signal having no time correlativity.

What we claim:

1. A reproducing device for a frequency modulated signal, comprising:

(a) reproducing means for reproducing a frequency modulated signal from a recording medium;

(b) demodulating means for frequency demodulating a signal reproduced by said reproducing means;

(c) generating means for generating a pilot signal relative to a discontinued part of the signal reproduced by said reproducing means;

(d) removing means for removing a high frequency zone of a signal produced from said demodulating means; and (e) control means for controlling in accordance with said pilot signal the frequency zone which is to be removed by said removing means.

2. A device according to claim 1, wherein said removing means includes a first low-pass filter and a second low-pass filter which has a lower cut-off frequency than said first low-pass filter.

3. A device according to claim 2, wherein said control means includes at least a switching circuit arranged to selectively produce a first demodulated signal coming through said second low pass filter and a second demodulated signal coming through said first low-pass filter.

4. A device according to claim 3, wherein said control means further includes a compensating circuit which compensates for time difference between said first and second demodulated signals.

5. A device according to claim 4, wherein said compensating circuit includes a delay circuit.

6. A device according to claim 1, wherein said generating means includes a drop-out detection circuit which detects a drop-out in said reproduced signal.

7. A device according to claim 6, wherein said reproducing means includes a plurality of reproducing heads.

8. A device according to claim 7, wherein said reproducing means includes a switching circuit which selectively makes output signal of said plurality of reproducing heads produced as said reproduced signal.

9. A device according to claim 8, wherein said generating means further includes a timing signal generating circuit which produces a signal according to the switching timing of said switching circuit.

10. A device according to claim 9, wherein said generating means further includes an OR circuit which is arranged to take a logical sum of a signal produced from said drop-out detection circuit and the signal produced from said timing signal generating circuit.

* * * * *